Aug. 29, 1939.  G. YANOCSIK  2,171,466
VEHICLE PARKING DEVICE
Filed March 28, 1938  2 Sheets-Sheet 1
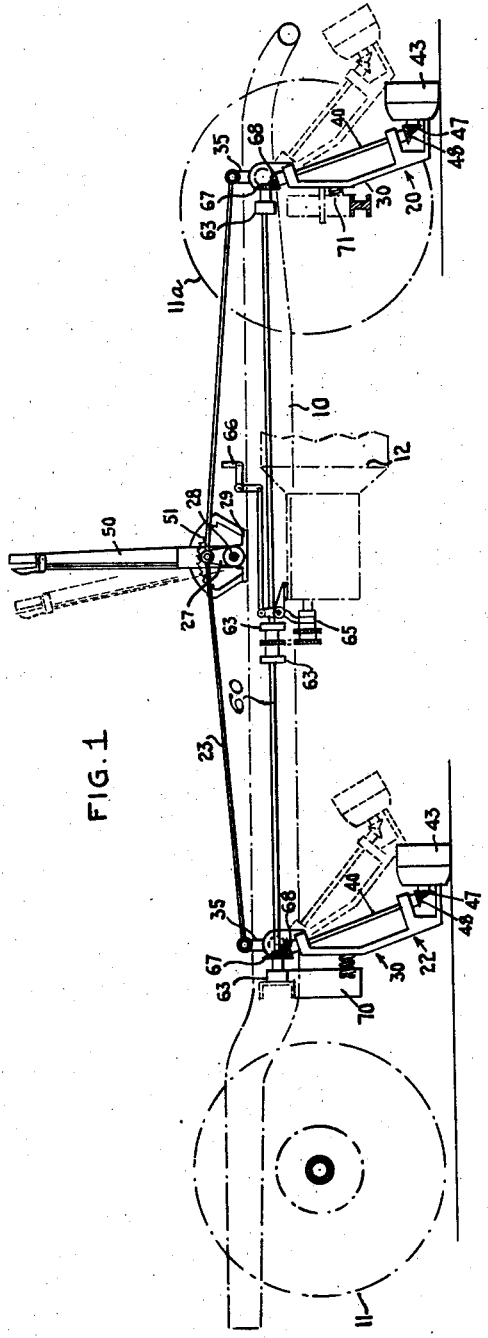
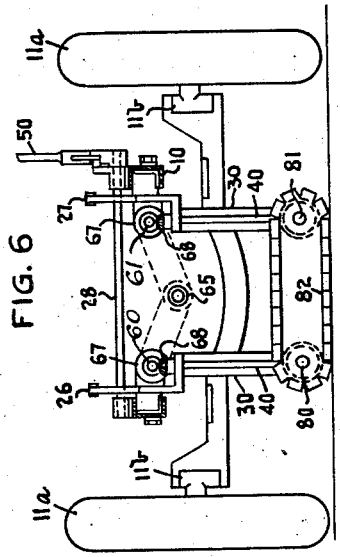
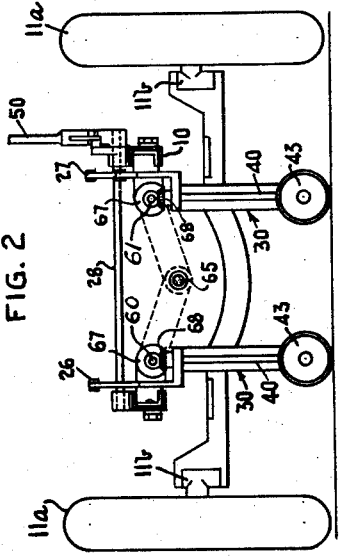
GUSTAVE YANOCSIK
INVENTOR
BY *Victor J. Evans & Co.*
ATTORNEYS Aug. 29, 1939.  G. YANOCSIK  2,171,466
VEHICLE PARKING DEVICE
Filed March 28, 1938  2 Sheets-Sheet 2

GUSTAVE YANOCSIK
INVENTOR

BY *Victor J. Evans & Co.*
ATTORNEYS

Patented Aug. 29, 1939

2,171,466

UNITED STATES PATENT OFFICE 2,171,466

VEHICLE PARKING DEVICE

Gustave Yanocsik, Brooklyn, N. Y.

Application March 28, 1938, Serial No. 198,552

2 Claims. (Cl. 180—1)

This invention relates to improvements in automobile parking devices, especially those of the type adapted to raise a vehicle from its ordinary driving wheels and move it substantially at right angles to its ordinary direction of travel.

It is among the disadvantages of motor vehicles of the type now known that in use considerable time is wasted maneuvering the vehicle into parking spaces, as for example into a space between other cars in a line, especially when the space is small and but slightly exceeds the overall length of the car. This disadvantage is also noted in commercial vehicles which are to be filled or to discharge their contents into openings in sidewalks or sides of buildings, in which case it is often a matter of extreme difficulty to properly maneuver the vehicle into a place suitable for loading or unloading.

Various expedients have been suggested in an effort to overcome or avoid these disadvantages but each of these expedients has in turn introduced new disadvantages of its own while effecting in a measure a solution of the aforesaid disadvantages. For example, in one device according to the prior art means are provided for intermittently imparting sideward movement of a vehicle. Among the disadvantages of this type of device are that the vehicle can be moved only a short distance at a time, that is to say, it must be picked up from its driving wheels, moved a short distance, redeposited on the surface upon which it rests and moved a further short distance. Moreover, this device is disadvantageous in that if, through inadvertence or mistake, the parking mechanism is actuated while the car is moving in its normal direction of travel the device would be destroyed or at least seriously damaged. Another prior art device includes means for utilizing an auxiliary set of wheels positioned at the back of the car for moving the back at a direction substantially at right angles to the normal direction of travel of the vehicle. Among the disadvantages of this type of structure are that the back only of the vehicle is moved and, accordingly, the front portion thereof cannot properly be moved into place and also that if, through accident or mistake, the parking device is put in operable position during travel of the vehicle it will become seriously damaged or destroyed as mentioned with the type of device above referred to. A third type of parking device according to the prior art comprises a plurality of hydraulic jacks or the like having wheels on the ends thereof whereby the device can be raised on the jacks and the wheels actuated to move the vehicle in a direction different from its normal line of travel. This structure is disadvantageous in that an auxiliary pumping system is necessary to actuate the jacks and, moreover, complex mechanism is necessary for the transmittal of driving force to the wheels at the base of the jacks whereby the vehicle is moved. A further disadvantage of this last mentioned type of device is that if, through inadvertence, the jacks are actuated while the vehicle is traveling in its usual direction of movement the device will be materially damaged or destroyed.

It is among the objects of the present invention to provide a novel parking device by means of which a vehicle can be moved in a direction different from its normal line of travel and which when through accident or mistake it is actuated during travel of the vehicle, will not be damaged thereby.

It is also an important object of the present invention to provide a device of the type indicated wherein auxiliary mechanism, such as hydraulic jacks, is not required for movement of the device into operable position but which instead is moved into position of itself by means including or at least depending upon the momentum or kinetic energy of the vehicle.

It is also an object of the present invention to provide a novel parking mechanism adapted to be included in an automobile at the time of construction or, if preferred, to being provided as auxiliary mechanism on a vehicle already constructed.

A further object is to provide novel means for moving a vehicle at substantially right angles of its normal direction of travel in a smooth, uniform and uninterrupted course of travel.

Among the features of the novel parking device according to the present invention are that it is relatively simple in construction and comprises comparatively few moving parts, none of which are delicately formed and prone to being damaged during ordinary usage.

Other objects, advantages and features of the novel parking device according to the present invention will be apparent to those skilled in the art during the course of the following description.

Regarded in certain of its broader aspects the present invention consists of a vehicle parking device comprising, in combination with a vehicle having an elongate essentially rectangular frame mounted on a plurality of traction wheels and adapted to travel, normally, in one general direction, a plurality of arms each pivoted at one end to said frame near the corners thereof, the free ends of said arms being adapted to being dropped during movement of said vehicle whereby, through engagement of said free ends with the surface whereon the vehicle is traveling, due at least in part to the kinetic energy of the vehicle, said vehicle is raised, lifting said traction wheels from said surface, locking means associated with said arms for retaining said vehicle in raised position, and means for imparting movement to said vehicle in a direction substantially at right angles to its normal direction of travel, said means comprising power driven parking wheels mounted on the free ends of said arms engageable with the surface upon which the vehicle travels when the vehicle is in raised position.

In order to facilitate a fuller and more complete understanding of the matter of the present invention a specific embodiment thereof, herein illustrated, will be hereinafter described, it being clearly understood however that the illustrated embodiment is given solely by way of example and is non-limitative.

Referring, then, to the drawings—

Fig. 1 is essentially a side elevational view of a vehicle frame showing the device according to the present invention mounted thereon;

Figs. 2 and 3 are substantially front elevational and top plan views, respectively, of the structure illustrated in Fig. 1;

Fig. 6 is substantially a front elevational view of a modified form of the structure illustrated in Fig. 1.

Figure 3:
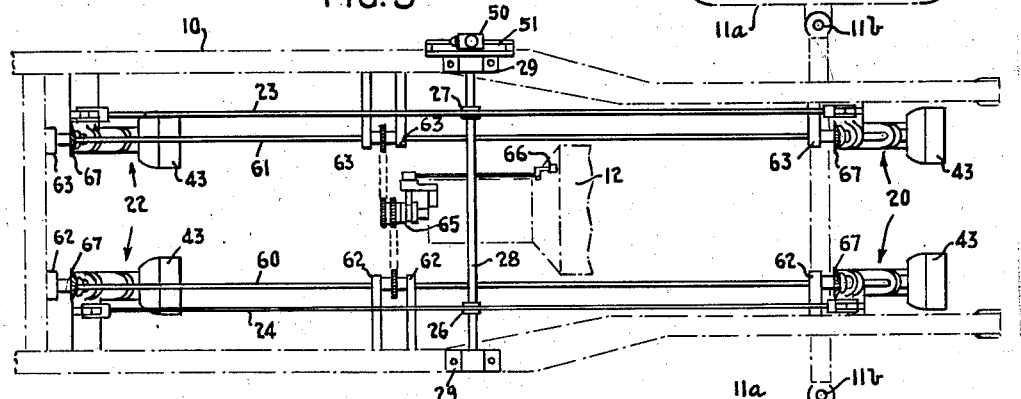

In the herein illustrated embodiment of the present invention the device is shown in use in combination with a vehicle frame of the conventional type, generally designated by the numeral 10, said frame being mounted upon rotatable and power-driven traction wheels designated by 11 and 11a, reference being made especially to Figs. 1–3, inclusive. The traction wheels 11a in the usual type of vehicle are the front wheels through which steering of the vehicle is accomplished. Accordingly, they are rotatable within limits about an axis, or pivot point 11b, perpendicular to the surface upon which the vehicle rests. Movement of these wheels is, of course, limited by engagement with the sides of the frame but, in general, the vehicle is adapted to move normally in a direction at least in line with the lengthwise axis of the elongate essentially rectangular chassis frame 10. An engine 12 is mounted on and carried by the frame 10 and is connected with the traction wheels 11 by means, not shown, whereby movement of the vehicle can be produced.

A pair of parking devices, hereinafter to be described and generally designated by the numeral 20, are provided in the front part of the vehicle frame and a similar pair, designated by the numeral 22, are provided in the rear part of the frame substantially as shown in Figs. 1 and 3.

Figure 4:
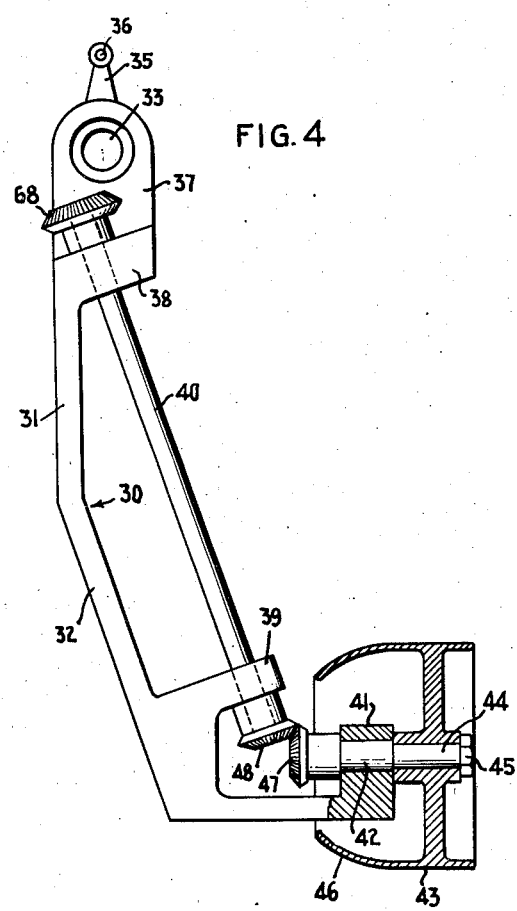
Figs. 4 and 5 are, respectively, a side elevational view partially in section and a front elevational view of one of the lifting arms and associating mechanism.
Figure 5:
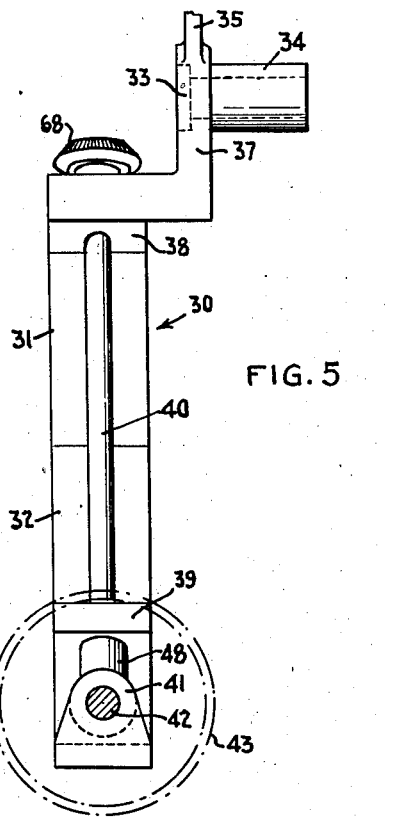

Each pair of parking devices 20 and 22 comprises a left hand member and a right hand member adapted to being positioned upon corresponding sides of the chassis frame. The member for the right hand side, viewing the vehicle from the front, is best illustrated in Figs. 4 and 5, it being understood of course that the devices for the left hand side would appear as the mirror image of the illustrated device. Referring, then, to those figures, it will be noted that the parking device comprises an essentially L-shaped member 30, consisting of a pair of arms 31 and 32 united with each other substantially as shown. The free end of the arm 31 is provided with an opening 33 formed therein having a bossed extension 34. The arm is mounted on the chassis frame by means of a stud receivable within and engageable with said opening 33 and substantially fixedly mounted on the chassis frame whereby said arm is firmly but rotatably mounted upon the frame as illustrated in Figs. 1–3, inclusive. A lug 35 having a bossed opening 36 formed in the end thereof is provided upon an offset portion 37 of the arm element 31 substantially as shown. Projecting portions 38 and 39 formed in the arm elements 31 and 32, respectively, are provided with openings formed therein adapted to rotatably receive and hold a shaft 40 extending therethrough. The free end of the arm element 32 is bent upwardly to form a lug-like member 41 having an opening therein adapted to receive and rotatably hold shaft 42, said shaft 42 having attached thereto a parking wheel 43 substantially as depicted in Figs. 4 and 5. It will be noted that said parking wheel 43 is mounted upon a portion 44 of the shaft 42 of relatively lesser diameter than the part within the bearing member 41, being fastened thereto by means including a threaded nut 45 engageable with screw threads formed on a part of said shaft, whereby the wheel is united to the shaft in a manner precluding relative rotative movement of said wheel with respect to said shaft. It will be noted that the back edge of the parking wheel 43 designated by the numeral 46, is bent toward the axis of said wheel substantially as shown in Fig. 4 for a purpose to be hereinafter described. Bevel gears 47 and 48 fixedly mounted on the shafts 42 and 40, respectively, mesh whereby rotative movement of the shaft 40 results in rotation of the said wheel 43.

As hereinbefore mentioned, each of the sets of parking devices 20 and 22 comprises a pair of structures, substantially as illustrated in Figs. 4 and 5 and hereinabove described, mounted on the frame of the vehicle. A series of connecting rods, four in number, designated by the numerals 23 and 24 are connected through the opening 36 in the projecting lug 35 of each of the parking device units whereby rotative movement of the devices about the respective mounting studs can be produced by reciprocating movement of said rods. The rods are connected near their mid points by means of lever arms 26 and 27 mounted on the shaft 28, journaled in bearings 29 and attached to the frame 10 substantially as shown. One end of said shaft 28 is provided with a shifting lever 50 having a pawl mounted thereon engageable, upon occasion, with an arcuately curved toothed rack 51 likewise mounted on the frame, whereby the arm 50 can be held in any selected one of a plurality of positions. It will be noted that movement of the arm 50 results in rotation of the shaft 28 which in turn is reflected in movement of the rods 23 and 24 whereby rotative movement about the mounting studs is imparted to each of the parking device structures heretofore referred to.

A pair of power-driven shafts 60 and 61 rotatably mounted upon a portion of the frame, as for example in the bearings 62 and 63, respectively, are operably associated with the engine 12 through the clutch generally designated at 65, said clutch being operable by the foot pedal 66 connected therewith. Bevel gears 67 are fixedly positioned upon the shafts 60 and 61 and rotatable thereby, said bevel gears being engageable with bevel gears, one of which is designated by the numeral 68, mounted on shafts, one of which is designated at 40, of the several units of the parking device. Referring especially to Fig. 1, it will be noted that the bevel gears 68 mesh or engage with bevel gears 67 when the parking device unit is in lowered position, as shown in full line in said figure, but are out of mesh when the parking device is in raised position, as shown in phantom.

In operation of the device hereinabove described, assuming the vehicle to be traveling in its normal direction of movement and the parking device elements in raised position, as illustrated in phantom in Fig. 1, the rate of movement of the vehicle is diminished to a degree dictated by experiment or experience and the lever 50 manipulated causing rotation of the shaft 28, movement of the connecting rods 23 and 24 and dropping of the parking elements 20 and 22. As the elements move downwardly the parking wheels of each engage with the surface whereon the vehicle rests whereby movement of the vehicle is arrested. It is to be noted that the parking device elements when in lowered position abut against the cushion stops 70 and 71 associated with the framework whereby movement of said devices is limited. The kinetic energy possessed by the vehicle as the result of its movement is dissipated when it is stopped by lowering of the parking device as aforesaid, this energy being translated into forces having a resultant component acting vertically from the surface whereon the vehicle rests whereby the vehicle is raised, thereby lifting the parking wheels 11 and 11a from the surface. The vehicle is held in raised position by engagement of a pawl carried on the lever arm 50 with the arcuately curved toothed rack 51 as hereinbefore described. By manipulation of the foot pedal 66 the clutch 65 is engaged with the driven shaft of the engine 12 whereby the shafts 60 and 61 are rotated, thereby causing rotative movement of the several traction wheels of the parking device units, thus resulting in sideward movement, that is to say movement substantially at right angles to the normal direction of movement of the vehicle.

When it is desired to stop the sideward movement of the vehicle the pawl carried on the lever arm 50 is disengaged from the toothed rack 51 whereby the vehicle against rests on the traction wheels 11 and 11a as normally.

It is to be noted that the inwardly curved end portions of the parking wheels facilitate gripping by the wheels of the surface whereon the vehicle rests when the device is operated.

A modified form of the present invention is illustrated in Fig. 6, like reference numerals being used to designate equivalent parts, wherein it will be noted that the auxiliary parking wheels 80 and 81 of the parking device units are provided with a continuous caterpillar tread 82 passing therearound and actuated thereby. This form of the present invention is especially suited for use on vehicles used in mud, snow or the like.

It is to be understood that this improvement is capable of extended application and is not confined to the exact showing of the drawings nor to the precise construction described and, therefore, such changes and modifications may be made therein as do not affect the spirit of the invention nor exceed the scope thereof as expressed in the appended claims.

I claim:

1. In combination with a vehicle of the type described having an elongate essentially rectangular chassis frame mounted on a plurality of traction wheels, said frame carrying and having mounted thereon an engine associated with said wheels adapted to move said vehicle, normally, in one direction over a surface whereon the vehicle rests, a parking device adapted to move said vehicle in a direction substantially at right angles to its normal direction of movement, said device comprising a plurality of members each of modified L-shape, one of said members being pivoted at one end thereof to said frame near each corner thereof, the free ends of said members being adapted to being dropped during movement of said vehicle whereby, through engagement of said free ends with the surface whereon the vehicle is traveling, said vehicle is raised, due in part at least to the vertically acting component of force resultant from the kinetic energy of the moving vehicle dissipated by engagement of said members with said surface, lifting said traction wheels from said surface, locking means associated with said members for retaining said vehicle in raised position, said locking means comprising rods connecting said members and simultaneously movable therewith, a pivoted shifting lever connected with and adapted to actuate said rods, an arcuately curved toothed rack positioned adjacent said lever, a spring pressed pawl carried on said lever engageable with said rack adapted to hold said lever in any selected one of several positions; means for imparting movement to said vehicle in a direction different from its normal direction of travel, while said vehicle is in raised position, said means comprising a plurality of auxiliary traction wheels, one of said wheels being rotatably mounted on the free end of each of said members and being engageable with the surface whereon the vehicle rests when said vehicle is in raised position, and means for connecting said auxiliary traction wheels with the engine of said vehicle, said means comprising at least one power-driven shaft, rotatably mounted on and extending lengthwise of said vehicle frame, associated with and operated by said engine, shafts rotatably mounted in each of said L-shaped members, gears operably connecting said shafts with said power-driven shaft and means operably connecting said shafts with said auxiliary traction wheels whereby said wheels can be rotated by said engine.

2. In combination with a vehicle of the type described having an elongate essentially rectangular chassis frame mounted on a plurality of traction wheels, said frame carrying and having mounted thereon an engine associated with said wheels adapted to move said vehicle, normally, in one direction over a surface whereon the vehicle rests, a parking device adapted to move said vehicle in a direction substantially at right angles to its normal direction of movement, said device comprising a plurality of members, each of modified L-shape and comprising a pair of arm elements, one of said members being pivoted at one end of one arm element thereof to said frame near each corner thereof by means including a stud, substantially fixedly mounted on a portion of said frame, receivable in and engageable with an opening formed in said member, the free ends of said members being adapted to being dropped during movement of said vehicle whereby through engagement of said free ends with the surface whereon the vehicle is traveling, said vehicle is raised, due in part at least to the vertically acting component of force resultant from the kinetic energy of the moving vehicle dissipated by engagement of said members with said surface, lifting said traction wheels from said surface, locking means associated with said members for retaining said vehicle in raised position, said locking means comprising rods connecting said members and simultaneously movable therewith, a pivoted shifting lever connected with and adapted to actuate said rods, an arcuately curved toothed rack positioned adjacent said lever, a spring pressed pawl carried on said lever engageable with said rack adapted to hold said lever in any selected one of several positions; means for imparting movement to said vehicle in a direction different from its normal direction of travel, while said vehicle is in raised position, said means comprising a plurality of auxiliary traction wheels, one of said wheels being rotatably mounted on the free end of each of said members and being engageable with the surface whereon the vehicle rests when said vehicle is in raised position, and means for connecting said auxiliary traction wheels with the engine of said vehicle, said means comprising at least one power-driven shaft, rotatably mounted on and extending lengthwise of said vehicle frame, associated with and operated by said engine, shafts rotatably mounted in each of said L-shaped members, gears operably connecting said shafts with said power-driven shaft and means operably connecting said shafts with said auxiliary traction wheels whereby said wheels can be rotated by said engine.

GUSTAVE YANOCSIK.